United States Patent [19]

Grünau

[11] 4,375,011
[45] Feb. 22, 1983

[54] CABLE CONNECTOR

[76] Inventor: Dietrich Grünau, Säntisblick 5, D - 7778 Markdorf, Fed. Rep. of Germany

[21] Appl. No.: 241,371

[22] Filed: Mar. 6, 1981

[30] Foreign Application Priority Data

May 7, 1980 [DE] Fed. Rep. of Germany ....... 3017383

[51] Int. Cl.³ .............................................. H02G 3/18
[52] U.S. Cl. ................................ 174/65 SS; 277/208; 277/112
[58] Field of Search ..................... 174/65 SS; 285/353, 285/354, 356, 357; 277/208, 225, 110, 112

[56] References Cited

U.S. PATENT DOCUMENTS 2,021,745 11/1935 Pfefferle et al. ................. 277/112 X
2,941,025 6/1960 Wayman ......................... 174/65 SS
3,567,843 3/1971 Collins et al. ................. 174/65 SS X Primary Examiner—A. T. Grimley
Assistant Examiner—D. A. Tone
Attorney, Agent, or Firm—Offner and Kuhn

[57] ABSTRACT

A cable connector comprises a screw socket, a screw nut, a packing within the screw nut and an anti-rotation bushing between the packing and the screw nut. The screw nut, packing and bushing are provided with conical portions respectively which have the same angle of taper and substantially the same axial length. Between a cylindrical portion of the packing and the threaded portion of the screw nut an annular recess is formed into which a cylindrical rim of the bushing protrudes.

The screw nut can easily be screwed on the socket only by hand because of the low friction effect between the bushing and the screw nut, thereby deforming the packing whereby a fluid-tight seal between the socket and the cable is gained and the cable is secured against twisting during the screw-operation and secured against axial movement at the end of said screw-operation.

8 Claims, 2 Drawing Figures

CABLE CONNECTOR

BACKGROUND OF THE INVENTION

A plurality of cable connectors are known using a socket, a screw nut, and a tubular rubber packing within the screw nut surrounding the cable. When the screw nut is screwed on the socket the packing becomes deformed whereby the cable is clamped and a sealing is gained. But disadvantages arise because the packing tends to rotate with the screw nut thereby twisting the cable.

In order to overcome these disadvantages, German Utility Model No. 18 57 080 suggests providing an anti-rotation ring supported within the screw nut for a relative rotation between the parts. However the packing still remains in contact with the thread of the screw nut and a torque is transmitted to the packing sufficient to twist the cable.

BRIEF SUMMARY OF THE INVENTION

One object of the invention is to provide a fluid-tight cable connector comprising an anti-rotation bushing between the screw nut and the rubber packing, and to improve the bushing and the packing in order to minimize the torque between the screw nut and the packing during the screwing operation.

Another object of the invention is to provide a cable connector comprising a new packing which—at the same time—provides for a fluid tight seal at predetermined sealing areas between the cable, the packing, the socket, and the screw nut and provides for a secure clamping of the cable, whereby the clamping areas between the cable and the packing at least partly coincide with the sealing areas.

One further feature of the invention is to provide a new cable connector which can easily be screwed on the socket by hand without using tools.

Another object of the invention is to provide a cable connector in which the cable is softly and carefully gripped by a force actuation instead of using clamping-jaw-like means pressing or digging into the cable.

A still further object is to provide a cable connector in which the resilient rubber packing is the only element contacting the cable.

One further object is to provide a cable connector which has a high safety against buckling of the cable at the mouth of the screw nut.

Last but not least it is an object of the invention to provide a cable connector in which one size can be used to connect cables of a great variety of outer diameters for example from 11 mm to 15 mm.

Further objects of the invention will be gained from the following description and claims.

DESCRIPTION OF A PREFERRED EMBODIMENT

Figure 1:
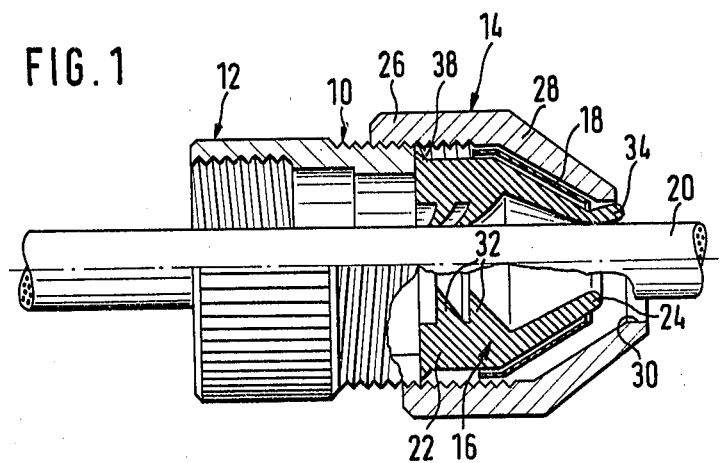
FIG. 1 shows a cross-section of a cable connector in which the upper half represents the parts in their clamping and tightening positions whereas the lower half shows the parts in their original shapes before deforming the packing.

A cable connector 10 comprises a socket 12 provided with an outer thread, a sleeve-like screw nut 14 consisting of a cylindrical portion 26 and a conical portion 28, the cylindrical portion of which has an inner thread engaging the outer thread of the socket. A resilient rubber packing 16 also consists of a cylindrical portion 22 and a conical portion 24. A thin-walled anti-rotation bushing 18 inserted between the screw nut 14 and the packing 16 consists of a cylindrical rim and a conical portion. At least the outer surfaces of the bushing are smooth. The bushing is made of low-friction material as polyamide or polytetrafluoroethylene. The conical portion 28 of the screw nut has a conical inner surface which is also smooth to provide a low friction contact with the bushing 18. It is essential that the angle of taper of the outer conical packing surface in the original non-deformed condition of the packing is the same as the inner conical screw nut surface and the conical bushing portion. Also the axial lengths of these conical surfaces are substantially equal. This includes an embodiment in which the conical packing portion 24 is made slightly longer than the conical bushing portion, but it is sufficient that in using an arrangement consisting of the bushing 18 and the non-deformed packing 16 inserted in the bushing so that the conical surfaces will contact one another, the front edges of the bushing and the packing lie in a common radial plane.

The cylindrical portion of the packing 16 has an outer diameter smaller than the inner diameter of the thread of the screw nut whereby an annular recess is formed between these parts into which the cylindrical rim of the bushing protrudes, the outer diameter of which should be substantially equal with the inner thread diamater of the screw nut, so that the bushing is centered in the screw nut and because the axial rim of the bushing is fitted on the packing also the latter is centered.

There are only two predetermined areas of contact between the packing and the screw nut. First an outer ring-shaped sealing lip 38 is integrally formed at or near the (leftside) front face of the packing and extends radially outwards from the outer cylindrical circumference thereof. The sealing lip is of wedge-shaped cross-section engaging between adjacent thread flanks of the screw nut thread, at least when the packing is deformed during the screwing operation. This outer sealing lip 38 centres the rearward end of the packing in the screw nut and seales the screw nut. The second contact area between the packing and the screw nut exists in the mouth 30 at the end of the conical portion 28 of the screw nut, when the latter is screwed on the socket in order to deform the packing. As it can be seen in the upper half of FIG. 1 when the arrangement comprising the parts 14, 16, 18 is fitted over a cable 20 an annular recess is formed between the cable and the screw nut mouth 30 and the end of the conical portion 24 of the packing is urged into this annular recess forming an excellent seal between the cable and the packing body and between the latter and the screw nut. Also a very good mechanical clamping effect is gained between the screw nut and the cable by the end of the conical packing portion squeezed into the annular recess.

It should be noted that only because of better illustration in FIG. 1 the end of the conical portion 24 seems to only partly fill the annular recess. In practice this recess is completely filled by the end of the conical packing portion, when the screw nut takes its end position and more-over material protrudes from the recess outwardly and forms a ring-shaped edging or bordering 34 providing an effective protection against buckling of the cable. The cable is clamped softly and uniformly around its circumference avoiding any local impressions.

Due to the axial movement of the screw nut during screwing the packing is pressed axially against the front face of the socket providing a good seal.

The cylindrical portion 22 of the packing 16 is integrally formed with a pair of ring-shaped inner lips 32 which are of wedge-shaped cross-section. The bisecting line of the wedge angle tapers rearwardly (to the left side) and inwardly. That means the lips 32 extend with an axial component in counter-direction to that of the conical portion 24 of the packing. The lips have an inner diameter smaller than the smallest diameter of the conical portion of the non-deformed packing. In order to give both said lips a substantially equal sealing effect it has been found advantageous to make the first lip 32—as seen from the (left) front face of the cylindrical portion of the packing—inwardly extend a slightly greater distance than the second lip situated between the first lip and the conical portion. Due to the rearward inclination of the lips 32, the cable 20 with an diameter greater than the inner diameter of the lips 32 can easily be inserted from the right and pushed to the left into the socket whereby the lips are deformed and further bent rearwardly when the screw nut 14 is screwed on and the radial pressure exerted on the cable is increased. Thereafter the cable can not be pulled out toward the opposite direction but also a sufficient resistance is gained against pushing the cable inwardly into the socket.

As seen in the drawing the inner lips 32 and also the outer lip 38 have radial flanks facing the socket 12 and further have inclined flanks. The inclined flank of the first lip 32—as seen from the left—is spaced axially from the radial flank of the second lip 32.

In the shown embodiment the inner surface of the conical portion 24 of the tubular packing is also formed conically but with a smaller angle of taper than the outer conical surface. Thereby the wall-thickness of the conical portion of the packing reduces continuously to the end thereof. According to an alternative embodiment—not shown—the inner surface of the conical portion 24 of the packing is composed of a pair of cones, a first cone adjoining said pair of inner lips 32 having a greater taper and a second cone having a smaller taper. The taper of the first cone can be the same as that of the outer conical surface. The second cone then is almost a cylindrical surface. This alternative embodiment is preferable for small size connectors.

Figure 2:
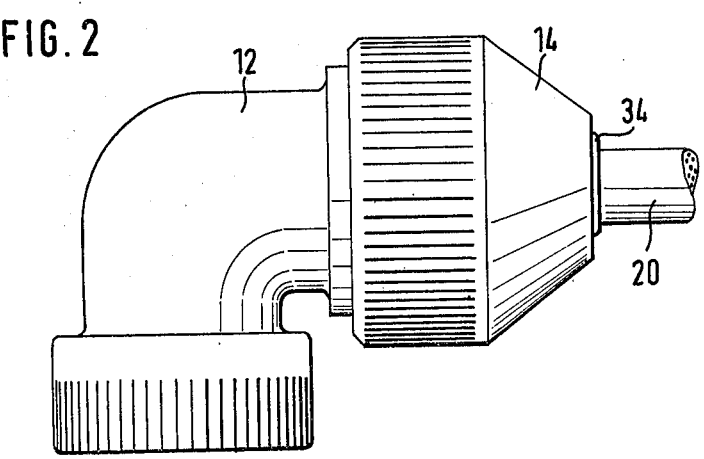
FIG. 2 shows a view of a cable connector in form of an angle socket.

From the foregoing it should be clear that the screw nut 14 can be screwed on the socket with only a small torque so that a knurl on the screw nut as shown in FIG. 2 is appropriate for hand-operation without using tools. The connector as shown is extremely short and nevertheless brings the advantages of an air-tight sealing and a soft but safe mechanical fastening of the cable avoiding any danger of twisting the cable.

I claim:

1. A fluid-tight cable connector for connecting electric cables with switch cabinets, plug-in connections and the like comprising a screw socket provided with an outer thread, a screw nut provided with an inner thread, a tubular rubber packing arranged within the screw nut and a thin-walled anti-rotation bushing arranged between the screw nut and the packing; the screw nut comprising an inner cylindrical portion provided with said inner thread and an inner conical portion, the mouth of which having an overdimension with respect to the cable diameter; the tubular packing comprising a cylindrical portion and a conical portion, the cylindrical portion having a radial front face abutting at a front face of the socket, said packing being provided with at least one deformable inner ring-shaped sealing lip and one outer ring-shaped sealing lip, an annular recess being formed between the cylindrical portion of the packing and the inner thread of the screw unit, the anti-rotation bushing also comprising a cylindrical portion and a conical portion, the cylindrical portion being of shorter axial length than the cylindrical portion of the packing and protruding into said annular recess; the outer conical surface of the packing, the conical portion of the bushing and the inner conical portion of the screw nut having the same angle of taper and substantially the same axial length.

2. A connector as claimed in claim 1, wherein the wall-thickness of the conical portion of the packing reduces to the smaller end thereof.

3. A connector as claimed in claim 1, wherein the outer ring-shaped sealing lip is of outwardly tapering wedge-shaped cross-section with a sufficient radial dimension for engaging into the thread of the screw nut.

4. A connector as claimed in claim 1, wherein two inner ring-shaped sealing lips are provided each of which is of inwardly tapering wedge-shaped cross-section and extends with an axial component in counter-direction to that of the conical portion of the packing.

5. A connector as claimed in claim 4, wherein the first one of said sealing lips as seen from the front face of the cylindrical portion of the packing inwardly extends a slightly greater distance as compared with the second one.

6. A connector as claimed in claim 4 or 5, wherein one flank of the inner sealing lips respectively lies in a substantially radial plane.

7. A connector as claimed in claim 1 or 3, wherein the front face of the outer sealing lip facing in the same direction as the front face of the cylindrical portion of the packing lies in a radial plane.

8. A connector as claimed in claim 1, wherein the anti-rotation bushing is made of a material selected from a group which consists of polyamide and polytetrafluorethylene.

* * * * *